United States Patent [19]

Tran

[11] Patent Number: 5,185,868
[45] Date of Patent: Feb. 9, 1993

[54] APPARATUS HAVING HIERARCHICALLY ARRANGED DECODERS CONCURRENTLY DECODING INSTRUCTIONS AND SHIFTING INSTRUCTIONS NOT READY FOR EXECUTION TO VACANT DECODERS HIGHER IN THE HIERARCHY

[75] Inventor: Thang M. Tran, Austin, Tex.

[73] Assignee: Advanced Micro Devices, Inc., Sunnyvale, Calif.

[21] Appl. No.: 464,918

[22] Filed: Jan. 16, 1990

[51] Int. Cl.⁵ .................. G06F 9/30; G06F 9/34; G06F 9/38

[52] U.S. Cl. .................. 395/375; 364/965.4; 364/965.7; 364/966.2; 364/DIG. 2; 364/244.3; 364/244.5

[58] Field of Search .................. 395/375

[56] References Cited

U.S. PATENT DOCUMENTS

| | | | |
|---|---|---|---|
| 4,025,771 | 5/1977 | Lynch, Jr. et al. | 364/736 |
| 4,200,927 | 4/1980 | Hughes et al. | 395/375 |
| 4,439,828 | 3/1984 | Martin | 395/375 |
| 4,714,994 | 12/1987 | Oklobdzija et al. | 395/375 |
| 4,739,472 | 4/1988 | Hayashi | 395/375 |

OTHER PUBLICATIONS

Acosta, et al., An Instruction Issuing Approach to Enhancing Performance in Multiple Functional Unit Processors, Sep. 1986, IEEE Transactions on Computers, vol. C-35, No. 9, pp. 815-828.

Weiss, et al., Instruction Issue Logic in Pipelined Supercomputers, Nov. 1984, IEEE Transactions on Computers, vol. C-33, No. 11, pp. 1013-1022.

Wang, et al., Distributed Instruction Set Computer, Aug. 1988, International Conference on Parallel Processing, pp. 1-4.

Primary Examiner—Thomas C. Lee
Assistant Examiner—Paul Harrity
Attorney, Agent, or Firm—Foley & Lardner

[57] ABSTRACT

An apparatus for use with a computing device for executing instructions in a logical sequence according to a control program, comprises an instruction buffer of FIFO construction serially connected to a decoder buffer also of a FIFO construction. The decoder buffer includes a number of decoder units arranged in a hierarchical manner from a lowest-significance decoder unit to a highest-significance decoder unit in order to maintain the logical sequence of the instructions. The decoder units concurrently decode instructions transmitted from the instruction buffer and concurrently determine whether a corresponding decoded instruction is ready to be sent to an instruction executing unit. Each decoder unit is capable of sending a corresponding instruction to the instruction executing unit. Instructions ready to be sent are sent to the instruction executing unit, according to the logical sequence. Instructions not ready to be sent are shifted to higher-significance available vacant decoder units, while maintaining the logical sequence of the instructions.

5 Claims, 3 Drawing Sheets

APPARATUS HAVING HIERARCHICALLY ARRANGED DECODERS CONCURRENTLY DECODING INSTRUCTIONS AND SHIFTING INSTRUCTIONS NOT READY FOR EXECUTION TO VACANT DECODERS HIGHER IN THE HIERARCHY

BACKGROUND OF THE INVENTION

The present invention involves an apparatus for executing instructions in a computing device. In particular, the present invention provides an apparatus having a pipeline architecture for executing instructions in a high-speed computing device having a plurality of functional units.

A critical consideration in the design of high-speed computing devices having multiple function units is the speedy and orderly execution of instructions. Prior art approaches in such apparata do not execute enough instructions per machine cycle to fully utilize the functional units of such computing devices, and, thereby, realize the high performance level achievable with such powerful instruction execution resources.

Prior art approaches to providing high-speed instruction execution utilize a pipelining of instructions to achieve the speed of execution desired. Typical prior art approaches are described in "An Instruction Issuing Approach to Enhancing Performance in Multiple Functional Unit Processors", by Acosta et al., IEEE Transactions on Computers, Vol. C-35, No. 9, September, 1986; in "Instruction Issue Logic in Pipelined Supercomputers", by Weiss et al., IEEE Transactions on Computers, Vol. C-33, No. 11, November, 1984; and in "Distributed Instruction Set Computer", by Wang et al., International Conference on Parallel Processing, August, 1988.

Among the design trade-offs involved in designing computing devices are the issues of instruction scheduling, instruction issue logic complexity, and hardware costs. Recent developments in large system integration approaches to hardware solutions have served to reduce the impact of hardware costs in the design of computing devices so that hardware solutions are more viable in designing computing devices than was the case in earlier times.

There are basically two ways that instruction code scheduling can be accomplished. First, such scheduling can be done at compile time by the software run by the computing device; this is referred to as "static" scheduling because it does not change as the program runs. Second, it can be done by the hardware at run time. This is referred to as "dynamic" scheduling. The two methods are not mutually exclusive. Using complex issue logic and dynamic scheduling of instructions, which allows instructions to begin execution out of order with respect to the compiled code sequence, relieves some of the burden on the compiler to generate a good schedule so that performance is not so dependent on the quality of the compiled code. Further, dynamic scheduling at issue time can take advantage of dependency information that is not available to the compiler at the time it would do static scheduling. However, such complex issue logic generally requires longer control paths which can necessitate a longer clock period.

Prior art approaches to such pipeline instruction issue logic problems often provided for inclusion of tags with instructions to indicate destinations associated with instructions. Such tags were generally associated with an instruction from the time the instruction was issued from memory storage until the time it was executed.

Weiss et al. discussed the use of such tags in conjunction with "reservation stations" assigned to each functional unit of the computing device. However, there was no provision that all data dependencies be resolved prior to the entering of instructions in Weiss' reservation station. Thus, the employment of such reservation stations as a buffer for a functional unit was inefficient since data dependencies could occur even while the instruction was located in the reservation station, thereby precluding the instruction's execution by the functional unit associated with the respective reservation station.

Acosta et al. described the addition of two fields to the instruction byte to identify data dependency information in terms of destination registers and source registers associated with the respective instructions. These data dependency fields operated much like the tags of the Weiss et al. approach, at least insofar as they accompanied the instructions throughout their handling and execution.

In contrast, the present invention employs a more truly dynamic scheduling approach for instruction execution in that the present invention employs first-in-first-out (FIFO) registers to ensure, through the inherent properties of such hardware, that the correct sequence of the instructions is maintained through their execution. Thus, no tags accompany the instructions through execution, and pipelining of the instructions is more efficiently effected than is accomplished with prior art devices.

The present invention takes advantage of the increasing power of microprocessor technology. As the microprocessor art advances, more functions can be implemented on the same chip, and clock speed is reduced. The conventional approach to improve performance of a computing device has been to implement more complex instructions and hardware and employ a simpler compiler, since the complex instructions execute faster in hardware than in software. However, complex instructions implemented in hardware may slow down the remainder of the instruction set which comprises the program being executed by the computer. An alternate approach is to have a simple instruction set designed so that most instructions execute in one clock cycle with the optimization of codes being accomplished by the compiler. Such an approach utilizes hardware logic instead of microcoding for speed in decoding, and such a simple instruction set leaves more area on the microprocessor chip for implementing more functions.

An important performance measurement for microprocessors is the number of clock cycles required to execute one instruction, or inversely, the number of instructions executed per clock cycle. With a single functional unit employed by the computer, the limit of performance is one instruction per clock cycle. Additional decoding and functional units may be employed on a microprocessor chip so that instructions can be executed in parallel. In the present invention, the instruction set is used with multiple decoding and functional units, the primary goal of which is a parallel microprocessor architecture that can effect execution of two instructions per clock cycle.

SUMMARY OF THE INVENTION

The present invention is an apparatus adaptable for use in a computing device for executing instructions. The apparatus employs a pipeline architecture and includes an on-board (i.e., on the microprocessor chip) instruction cache, a branch prediction unit, a first-in-first-out instruction buffer, multiple decoding units, multiple function-specific units with associated queueing buffers, a primary register, at least one temporary register, a store buffer, a data buffer, and an on-board data cache.

The preferred embodiment of the present invention employs a pipelined instruction execution architecture consisting of four stages: instruction fetch, decode, execution, and write-back. The pipelined architecture is close to the ideal case of one instruction per cycle if there is no branch instruction and if all instructions move through the "pipe" at the same speed. The expected "cost" of a branch is one cycle if the instructions can be fetched in the same cycle as the branch is executed, which will be the case when the instruction cache is on the chip (i.e., on-board).

When a branch instruction is encountered, the pipeline is held until the outcome of the branch instruction is known in execution. The compiler of the computing device can move an unrelated instruction from before the branch instruction to after the branch instruction, and such a moved unrelated instruction is called a delayed branch instruction. In the case where no instruction can be moved, a nested loop instruction is inserted after the branch. The pipeline, in the preferred embodiment, always executes one more instruction after a branch instruction.

In a pipeline architecture, the instruction bandwidth (i.e., the number of instructions fetched in response to a given fetch instruction) is critical to keeping the pipeline fully occupied. It is useful to employ an on-board instruction cache, with its faster access time, to achieve the necessary bandwidth to keep the pipeline fully occupied. An instruction buffer is employed to receive the multiple instructions from either the instruction cache or external memory and to forward those instructions to the decoding unit. Similarly, an on-board data cache in the apparatus provides the quick access time necessary to keep the pipeline fully occupied and preclude "clogging" the pipe with data waiting to be written or read to the external memory.

To further reduce disruptions in the pipeline due to branch instructions, a branch prediction technique is contemplated for the preferred embodiment of the present invention. As an example, a branch history table may be used to keep the most recent branch instructions to assist in the prediction by the branch prediction unit as to whether a loop will be taken or not.

A second major problem in the execution of multiple instructions is data contention. Data contention occurs when two different instructions require the use of the same operand from the primary register. This can occur when the operand is a source operand (data to be used by an instruction) or a resultant operand (data resulting from an executed instruction). Such a problem is commonly known as a READ-WRITE problem.

No data contention exists in a READ-AFTER-READ access, although WRITE-AFTER-READ is a potential problem. An instruction with a READ access requirement may take longer in execution and, therefore, be interrupted, thereby requiring that the data be read again from the primary register. WRITE access must wait until completion of a READ access instruction. In WRITE-AFTER-WRITE situations, the sequential order of the WRITE instructions must be reserved so that correct data may be maintained in the primary register.

READ-AFTER-WRITE is the primary contention to be dealt with in instruction execution. In such situations, READ access must wait for completion of WRITE access.

In the preferred embodiment of the present invention, a unique modified scoreboarding technique is employed to manage such data contention occurrences. Three tags are implemented in the primary register for such scoreboarding: a READ tag, which is a counter for READ access; a WRITE tag, which is a single bit controlling a WRITE access; and a TEMPORARY tag, which is a single bit indicating whether the most current data is in a temporary register or in the primary register.

The employment of temporary registers eliminates WRITE-AFTER-READ and WRITE-AFTER-WRITE contentions because data to be written to the primary register can be temporarily kept in the temporary register awaiting resolution of contentions. Tags are also associated with temporary registers: a VALID bit, a BRANCH prediction bit, and an address of a location in the primary register.

Thus, in the preferred embodiment of the present invention, all instructions after a branch instruction will have their associated branch bit set and resultant operands from these instructions will be stored in a temporary register. A store buffer is provided to store information which is processed through the pipeline after a branch instruction, pending the resolution of whether the branch prediction provided by the branch prediction unit is correct. A data buffer is also provided to store data which is processed through the pipeline after a branch instruction pending resolution of the correctness of the pending branch prediction. If the branch prediction is incorrect, all data related to instructions after the branch are removed from the pipe and from selected registers and buffers (temporary register(s), data buffer and store buffer).

An important consideration in the parallel execution of instructions is to correctly keep the sequence of instructions for reading and writing to the various registers and buffers, the data cache, and external memory. The sequence of instructions must also be maintained during decoding in order that accurate access to the primary register and correct setting of scoreboard tags in the register can be effected. The present invention employs a first-in-first-out structure for the instruction buffers and decoding units in order to maintain the correct sequence of instructions during their passage through the pipeline.

Each instruction buffer and decoding unit has a busy signal. For decoding units, if the source operands of the instruction can be accessed from the primary register, if an address is available for writing resultant operands of the instruction, and if the READ buses are available to transfer required information (such as source operands) from the primary register to an appropriate functional unit queueing buffer, then the decoding unit is ready to accept another instruction in the next cycle. If any of the above conditions is not satisfied, the decoding unit is designated as busy. In the next subsequent cycle, the information contained in busy decoding units will be shifted to more significant of the first-in-first-out decoding unit as available, and instructions contained in instruction buffers will be shifted into the then-available lesser significant decoding units. When all of the above conditions are satisfied, decoded instructions and their associated source operands are routed directly to specific functional unit queueing buffers for execution according to the operation to be effected by the instruction. Preferably, functional units are tailored to execute specific operations.

The preferred embodiment of the present invention is tailorable for anticipated applications for which the computing device is to be employed. Generally, two factors are considered in deciding the operation of the functional units: the types of operations and the frequencies of occurrence of such operations. Queueing buffers are provided for the functional units, with at least one functional unit associated with each queueing buffer, in order to smooth the flow of instructions through the pipeline architecture.

Thus, the present invention is an apparatus adaptable for use with a computing device for executing instructions in a logical sequence according to a control program and, in its preferred embodiment, comprises an instruction buffer of FIFO construction serially connected to a decoder which is also a buffer of FIFO construction. The decoder maintains a scoreboard of tags in a primary register to manage the instructions' execution by a plurality of functional units in an executing unit.

The decoder decodes the operational codes of the respective instructions, accesses the primary register to set the tags in the scoreboard to prevent the same portion of the primary register being accessed by two decoding units within the decoder at the same time, and reads the data from the primary register through the read buses to the functional units to provide appropriate source operands to the functional unit for the instruction being then decoded. The decoding units also reserve space in the primary register for resultant operands (i.e., the data which results from the execution of the respective instruction), thereby ensuring that a destination for the resultant operand is available.

Branch prediction is contemplated in the preferred embodiment of the present invention. The determination of the correctness of a branch prediction occurs in the executing unit, and handling of subsequent instructions is determined by the correctness or incorrectness of such branch predictions.

Further in the preferred embodiment of the present invention, the decoder is hierarchical in its construction so that decoding units within the decoder containing the oldest information have a higher priority in setting the scoreboard tags in the primary register. In such manner, further assurance of the correctness of the logical ordering of instructions is provided.

As previously mentioned, the preferred embodiment of the present invention contemplates that the executing unit will provide instruction queueing buffers for each functional unit, although similar functional units may share a queueing buffer. Decoded instructions are entered into respective queueing buffers only when ready for execution; i.e., only when no data dependencies remain unresolved with respect to the instruction to be entered in the queueing buffer.

By loading the queueing buffers only with instructions ready for execution with no data dependencies unresolved, and by providing a plurality of operation-specific functional units, the functional units can be more efficiently employed than occurred with prior art devices, and instruction execution can approach a rate of execution of two instructions per clock cycle.

It is, therefore, an object of the present invention to provide an apparatus adaptable for use with a computing device for executing instructions in a logical sequence according to a control program which efficiently employs a plurality of functional units to execute instructions.

It is a further object of the present invention to provide an apparatus adaptable for use with a computing device for executing instructions in a logical sequence according to a control program which is capable of a high frequency of instruction execution per clock cycle.

A further object of the present invention is to provide an apparatus adaptable for use with a computing device for executing instructions in a logical sequence according to a control program which achieves ordering of instructions by employing hierarchical FIFO structured hardware.

Further objects and features of the present invention will be apparent from the following specification and claims when considered in connection with the accompanying drawings illustrating the preferred embodiment of the invention.

DETAILED DESCRIPTION OF THE DRAWINGS

DETAILED DESCRIPTION OF THE INVENTION

Figure 1:
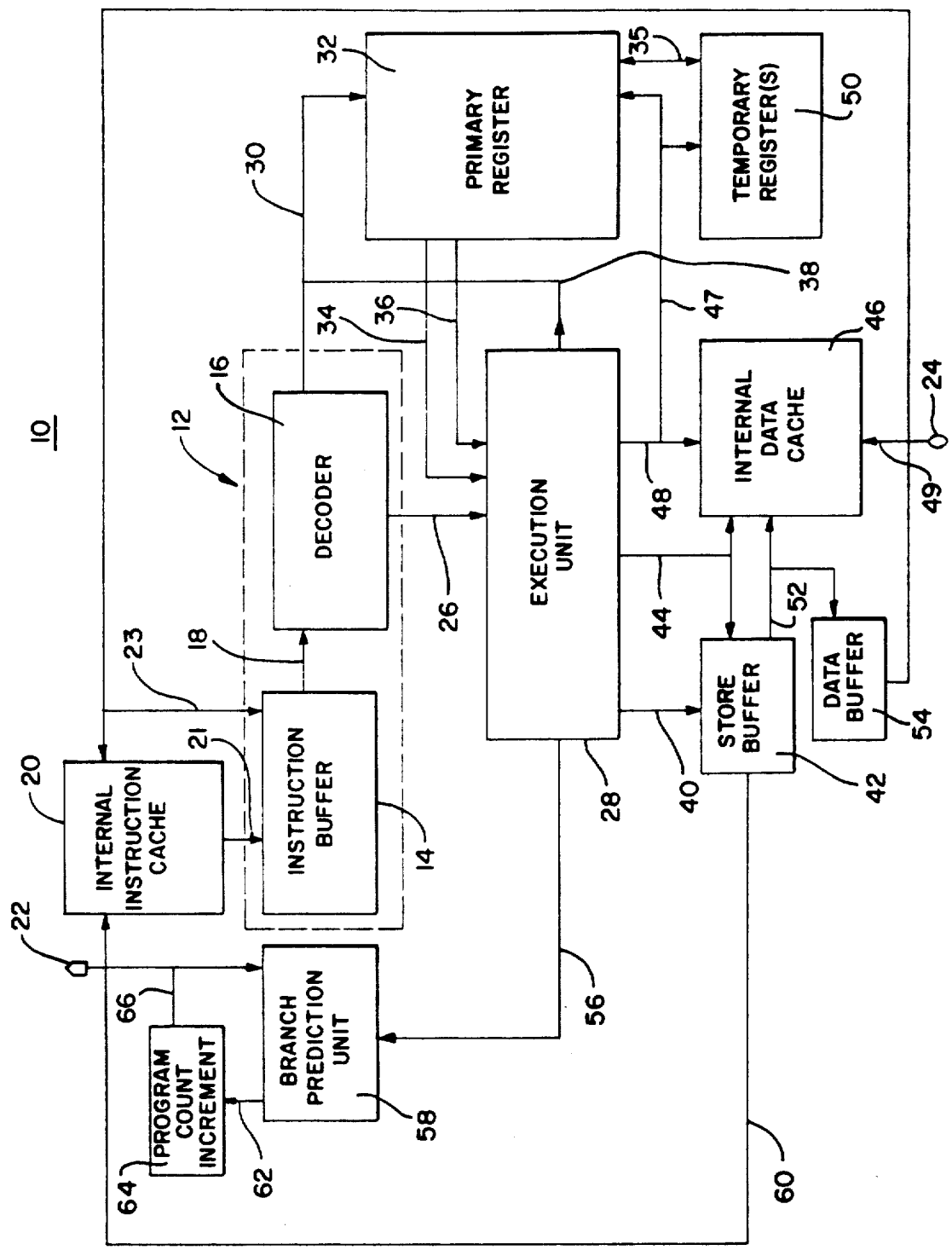
FIG. 1 is a schematic block diagram of the preferred embodiment of the present invention.

In FIG. 1, an apparatus 10 adaptable for use with a computing device (not shown) for effecting execution of instructions according to a control program is illustrated in schematic block diagram form.

Apparatus 10 includes an instruction buffer-decoder 12. The instruction buffer-decoder 12 is comprised of an instruction buffer 14 and a decoder 16. An output bus 18 from instruction buffer 14 is provided as an input to decoder 16 in a manner which will be described in greater detail hereinafter. Inputs to instruction buffer 14 are applied, as illustrated in FIG. 1 at input 21, from an internal instruction cache 20 or at input 23 from an external memory (not shown) via bus 25 from terminal 24. In the case of receiving instructions from the external memory, the address of the instruction to be received is transmitted to external memory via address request terminal 22 and the associated instruction is received by the apparatus 10 via terminal 24. From terminal 24, the requested instruction is applied both to the instruction buffer 14 at input 23 and to internal instruction cache 20 in order that an on-board (i.e., on board the chip represented in FIG. 1) instruction cache can be maintained for future reference as required. Decoder 16 provides outputs as follows: output bus 26 provides decoded instructions to execution unit 28; output bus 30 provides information to primary register 32.

Execution unit 28 provides outputs as follows: output bus 38 is connected to primary register 32 through output bus 30 of decoder 16; output bus 40 is connected to store buffer 42; output bus 44 is connected to store buffer 42 and internal data cache 46; output bus 48 is connected to internal data cache 46, temporary register(s) 50, and primary register 32; and output bus 56 is connected to branch prediction unit 58.

Store buffer 42 is connected by output bus 52 to internal data cache 46 and data buffer 54. Store buffer 42 also is connected to an output bus 60 which is connected to address request terminal 22 and internal instruction cache 20. Branch prediction unit 58 is connected by an output bus 62 to program count incrementer 64. Program count incrementer 64 is connected to address request terminal 22 and branch prediction unit 58 by an output bus 66.

Internal data cache 46 is also connected to principal register 32 and temporary register 50 by output bus 47, as well as being connected to terminal 24 by bus 49.

In operation, the only communication between the apparatus 10 of FIG. 1 and external memory (not shown) is through LOAD and STORE commands. Thus, when data or an instruction is to be obtained from external memory, the address of that data or instruction is identified to external memory through address request terminal 22, and the thus-identified data or instruction is received by apparatus 10 through terminal 24.

Figure 2:
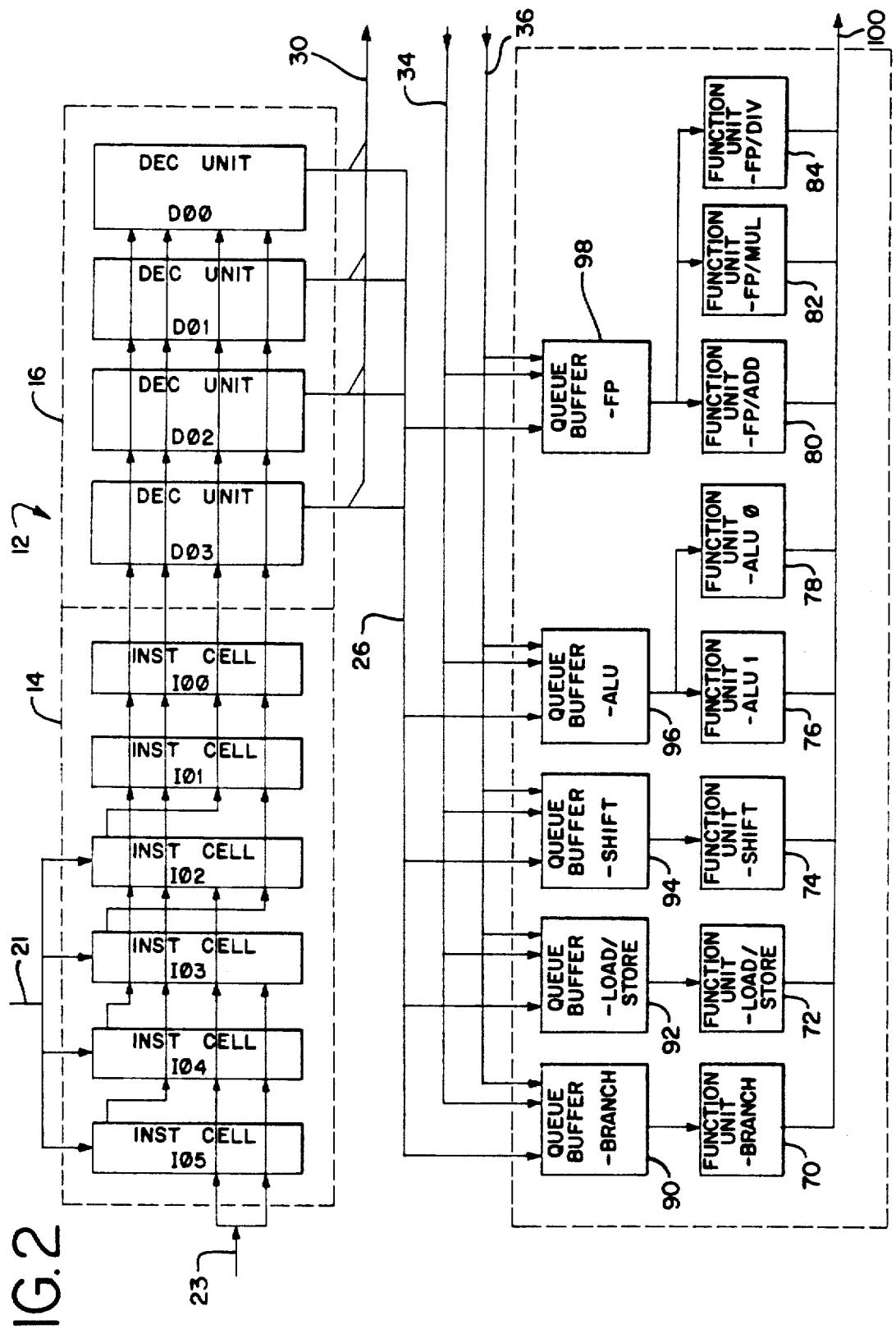
FIG. 2 is a schematic block diagram of the instruction buffer, the decoding buffer, and the executing unit of the preferred embodiment of the present invention.

Before explaining the operation of the apparatus 10 illustrated in FIG. 1, a detailed description of instruction buffer-decoder unit 12 and execution unit 16 will be provided in connection with FIG. 2.

For ease of understanding the present invention, like elements will be identified by like reference numerals throughout the various drawings herein.

FIG. 2 is a schematic block diagram of the instruction buffer-decoder and executing unit of the preferred embodiment of the present invention.

In FIG. 2, an instruction buffer-decoder 12 is comprised of an instruction buffer 14 and a decoder 16. Instruction buffer 14 receives input from input bus 21 which is connected to internal instruction cache 20 (FIG. 1), as well as from input bus 23 which is connected to receive inputs from an external memory through terminal 24 (FIG. 1).

Instruction buffer 14 is comprised, in turn, of a plurality of instruction storage cells $I_{00}$, $I_{01}$, $I_{02}$, $I_{03}$, $I_{04}$, and $I_{05}$. Storage cells $I_{00}$–$I_{05}$ are arranged to operate in a first-in-first-out manner in response to a control program operating on a clock cycle. Thus, input bus 21 can insert instructions into instruction cells $I_{02}$, $I_{03}$, $I_{04}$, or $I_{05}$. Information from instruction cell $I_{05}$ can be shifted directly to any of the empty higher order instruction cells ($I_{00}$–$I_{04}$). Information from instruction cell $I_{04}$ can be shifted directly to any of the remaining empty higher order instruction cells ($I_{00}$–$I_{03}$) in instruction buffer 14; similarly information from succeeding higher order instruction cells ($I_{00}$–$I_{02}$) can be shifted directly to any of the empty instruction cells ($I_{00}$–$I_{01}$) higher in the instruction buffer 14. Input from the external memory applied to instruction buffer 14 through input bus 23 can be directly applied only as high as information cell $I_{02}$, and for entry to higher ordered information cells such entry must await a subsequent clock cycle to apply the information to such higher order instruction cells as an output from the respective instruction cell to which it was initially input from the external memory via input bus 23. Decoder 16 is likewise configured as a first-in-first-out array of decoding units $D_{00}$, $D_{01}$, $D_{02}$, and $D_{03}$. Outputs of any of the information cells $I_{00}$–$I_{05}$ of instruction buffer 14 can be shifted into any of the empty decoding units $D_{00}$–$D_{03}$, and outputs of any of the decoding units $D_{00}$–$D_{03}$ can be shifted to any higher order decoding unit. In such manner, the instruction buffer-decoder 12 acts as a hierarchical first-in-first-out register ensuring that outputs from decoder 16 are applied to the execution unit 28 in the order in which they are introduced to the instruction buffer 14. Such a pipelining arrangement of instructions is important to ensure the proper order of execution of instructions, and the hardware arrangement illustrated in FIG. 2 inherently provides such an ordering of instructions. Individual decoding units $D_{00}$–$D_{03}$ provide outputs on output bus 30 to primary register 32 (FIG. 1) as well as outputs on output bus 26 to execution unit 28, all in response to the control program which controls operation of apparatus 10.

Execution unit 28 is comprised of a plurality of functional units 70, 72, 74, 76, 78, 80, 82, and 84 and associated queueing buffers 90, 92, 94, 96, and 98. Functional units 70, 72, 74, 76, 78, 80, 82, and 84 may be tailored to a particular application for which the apparatus 10 is intended to be employed. Thus, by way of example in FIG. 2, functional unit 70 is configured to effect branch operations, functional unit 72 is configured to effect load/store operations, functional unit 74 is configured to effect shift operations, functional unit 76 is configured as an arithmetic logical unit, functional unit 78 is also configured as an arithmetic logic unit, functional unit 80 is configured as a floating point adding unit, functional unit 82 is configured as a floating point multiplication unit, and functional unit 84 is configured as a floating point division unit.

As illustrated in FIG. 2, queueing buffers 90, 92, 94, 96, and 98 are associated with functional units 70, 72, 74, 76, 78, 80, 82, and 84 to provide a queue of instructions awaiting execution by respective functional units. The allocation of queueing buffers to functional units is also tailorable to specific needs for a given application for which apparatus 10 is to be employed. Thus, by way of example in FIG. 2, queueing buffer 90 is dedicated to functional unit 70, queueing buffer 92 is dedicated to functional unit 72, and queueing buffer 94 is dedicated to functional unit 74. In some applications, the arithmetic logic unit functional units are not often referenced and, thus, in the configuration of FIG. 2, queueing buffer 96 is shared by functional units 76 and 78. Similarly, queueing buffer 98 is shared by functional units 80, 82, and 84. An output bus 100 is indicated in FIG. 2 to schematically indicate an output of execution unit 28. It is understood by those skilled in the art that output bus 100 can be routed according to the control program to the various output buses 38, 48, 44, 40, 56 illustrated as connected with execution unit 28 in FIG. 1 according to the type of instruction processed by execution unit 28.

Referring to FIGS. 1 and 2, internal instruction cache 20 is organized to present to instruction buffer 14 four words per block with a set of valid bits for each word. A direct mapping-type cache is preferred for internal instruction cache 20 since the instruction stream is sequential. The control program (not shown) institutes an instruction fetch of a block (four words) through input bus 21 to instruction cells $I_{02}$, $I_{03}$, $I_{04}$, and $I_{05}$.

As previously mentioned, instruction buffer 14 is employed to avoid discontinuations in the instruction stream and is organized as a first-in-first-out array of instruction cells $I_{00}$, $I_{02}$, $I_{03}$, $I_{04}$, and $I_{05}$. Instructions can be forwarded in their sequential order according to the control program from any position in the instruction buffer 14 to any respective decoding unit $D_{00}$, $D_{01}$, $D_{02}$, $D_{03}$ within the decoder 16. Instruction buffer 14 is preferably comprised of six instruction cells $I_{00}$-$I_{05}$ so that, if in any given clock cycle the instruction queue awaiting shifting to the decoder 16 is two instructions or less, the next block of four words is automatically caused to be fetched from internal instruction cache 20 by the control program and is entered through input bus 21 into the four least significant instruction cells $I_{02}$-$I_{05}$.

Branch instructions are not detected until they reach a decoding unit $D_{00}$-$D_{03}$, so instructions in instruction cells $I_{00}$-$I_{05}$ and in decoding units $D_{00}$-$D_{03}$ are not flushed (i.e., the respective valid bits of those instructions are not set to "invalid") by prediction by the branch prediction unit 58 that a branch will be taken. In the event a branch is taken, a delayed branch instruction is not flushed. However, if the delayed branch instruction is not in decoder 16 or in instruction buffer 14, then a branch instruction in execution unit 28 must wait for the delayed branch instruction before the branch instruction is executed.

Decoder 16, through its decoding units $D_{00}$-$D_{03}$, decodes the operation codes of the respective instructions, accesses primary register 32 to set tags in the scoreboard residing in primary register 32, and reads data from primary register 32 to READ buses 34, 36 for use by functional units 70, 72, 74, 76, 78, 80, 82, 84, as appropriate to the respective instruction being decoded and executed. Decoding units $D_{00}$-$D_{03}$ are arranged in a first-in-first-out array so that the instruction first in the array (i.e., in the most significant decoding unit $D_{00}$) is the first instruction of the sequence. Further, decoder 16 is hierarchical in that the more significant decoding units $D_{00}$-$D_{03}$ have priority in setting tags in the scoreboard in primary register 32. Thus the sequential nature of the instructions processed through apparatus 10 is preserved.

All decoding units $D_{00}$-$D_{03}$ access primary register 32 at the same time, however the priority assigned with respect to the significance of the decoding unit $D_{00}$-$D_{03}$ operates to prioritize access of the same operand (source operand or resultant operand) in the case of simultaneous access by more than one decoding unit.

As explained above, the scoreboard contained in primary register 32 and maintained by decoder 16 preferably involves three tags: a READ tag, which is a counter for READ access; a WRITE tag, which is a single bit indicating availability for WRITE access; and a TEMPORARY tag, which is the address of a particular temporary register, such as temporary register 50, where a temporary copy of data may be stored.

Since there can be many READ accesses to principal register 32 at a given time, a READ tag should be a counter of three bits. In decoding, the READ tag is increased, and as an instruction is completed in execution the READ tag associated with that instruction is decreased in primary register 32. If a TEMPORARY tag is set at the destination in primary register 32 for a resultant operand from an instruction, then the instruction must wait in decoder 16 until the TEMPORARY tag in primary register 32 is reset. This is the case when READ-AFTER-WRITE contention occurs. If the TEMPORARY tag in primary register 32 is not set, then the READ tag is increased. However, if the WRITE tag is set in primary register 32 in this situation, the instruction still must wait in decoder 16 until the WRITE tag is clear. The WRITE tag is set in primary register 32 according to the address of the resultant operand associated with a given instruction and is reset prior to write back of data from a functional unit 70, 72, 74, 76, 78, 80, 82, 84.

If an instruction in decoder 16 requires data which is being written to primary register 32, then that data will be forwarded by the control program directly to READ bus 34, 36 for use with the appropriate functional unit 70, 72, 74, 76, 78, 80, 82, 84 involved in executing the particular instruction. If a READ tag or a WRITE tag for the address of a resultant operand is set in primary register 32, then during decoding a TEMPORARY tag is set in primary register 32 at the address of the resultant operand to identify an address in temporary register 50. As the instruction completes execution, if the TEMPORARY bit in temporary register 50 is set, the READ and WRITE tag of the resultant operand are rechecked; if either the READ or WRITE tag is still set, then the resultant operand is written into temporary register 50 at the address identified by the TEMPORARY tag in primary register 32 to await later insertion in primary register 32 when the appropriate address becomes accessible. If both the READ tag and WRITE tag of the resultant operand are no longer set, then the resultant operand is written into primary register 32.

Thus, decoded instructions along with their operands (which are obtained from primary register 32 when available) are sent to execution unit 28 only when there is no contention indicated by the scoreboard in primary register 32 and the READ buses 34, 36 are available. Then, in the next cycle, the instruction sequence advances up the pipeline to fill the available most significant decoding units $D_{00}$-$D_{03}$ in the first-in-first-out hierarchical arrangement of decoder 16.

If an instruction is identified as a branch instruction, then branch prediction unit 58 will predict whether the branch will be taken or not taken, and will determine the next instruction address appropriate to the branch involved. If the branch is taken, the next instruction (i.e., the delayed branch instruction) in the pipeline is kept, and the rest of the pipe is flushed by setting the valid bits of the respective instructions to "invalid". In execution, the delayed branch instruction must be valid before the branch instruction can be executed. If branch prediction unit 58 has wrongly predicted the taken/non-taken result with respect to the branch instruction, this incorrect prediction is detected in execution unit 28 and the pipeline will be flushed (the valid bits set to "invalid"). The correct instruction sequence is determined by the control program and fetched from internal instruction cache 20 via input bus 21.

Upon completion of the instruction set, and for other outputs contemplated by the program represented by the instruction set, results are provided to external memory (not shown) through the use of a "STORE" instruction which is executed by functional unit 72. The STORE output instruction is communicated via output bus 40 to store buffer 42. The address of the information to be stored is forwarded to address request terminal 22 via bus 60, and the information to be stored is forwarded through terminal 24 via internal data cache 46 to external memory for further use by the computing device as required.

A "LOAD" instruction always has a higher priority than a "STORE" instruction because a "STORE" instruction does not affect contentions which may be present in primary register 32. Store buffer 42 is used to store data and associated addresses temporarily in the event that a "LOAD" instruction occupies a bus or other element of apparatus 10 and precludes the storage of information in external memory as described above. Store buffer 42 is also used to keep information which is to be stored according to a branch instruction. Data in store buffer 42 is only allowed to update internal data cache 46 or external memory when branch bits associated with the data are clear, thereby indicating that no further utilization of information stored in store buffer 42 will be required to complete execution of a branch instruction.

Primary register 32 is intended for quick local references of data for use by apparatus 10. In the preferred embodiment of the present invention, all instructions are intended to be simplified so that they either have immediate data available or may immediately reference primary register 32 for source operands as well as access primary register 32 to store resultant operands. Access to external memory is effected only by "LOAD" and "STORE" instructions. In the preferred embodiment, primary register 32 comprises 192 registers with a stack cache organization. The advantage of such a large primary register 32 is that fewer data contentions will occur and more flexibility and cooperation with the compiler is available. The size of the register is, of course, a design consideration since too large a register results in the disadvantage that the time required for a full context switch when apparatus 10 is required to execute a different program taking a long time to effect.

In execution unit 28, queueing buffers 90, 92, 94, 96, and 98 store instructions fully ready for execution by their respective associated functional units 70, 72, 74, 76, 78, 80, 82, 84. That is, all data contentions are resolved by decoding units $D_{00}$-$D_{03}$ prior to their passing a decoded instruction to execution unit 28 as well as effecting the passing of associated source operands from primary register 32 through READ buses 34, 36 to execution unit 28. Each entry in a queueing buffer 90, 92, 84, 96, 98 preferably consists of a decoded operation code, source operand(s) and result operand address(es), and bits indicating branch and temporary register address.

A queueing buffer of four entries is sufficient in handling a random instruction stream. A branch functional unit such as functional unit 70 requires only one buffer entry since two consecutive branch instructions are not simultaneously executed. The second of two consecutive branch instruction(s) is held in decoder 16 until the outcome of the preceding branch instruction is known. If the branch prediction is correct as provided by the branch prediction unit 58, all branch tags in the instruction cells $I_{00}, I_{01}, I_{02}, I_{03}, I_{04}, I_{05}$, in decoding units $D_{00}, D_{01}, D_{02}, D_{03}$, in queueing buffers 90, 92, 94, 96, 98, in temporary register 50, in store buffer 42, and in data buffer 54 will be cleared. The writing of information required by the branch is then effected. If, however, the branch prediction provided by branch prediction unit 58 is incorrect, all instruction and data entries in the above locations with the branch tags set will be removed by setting a valid bit associated with each of those entries to "invalid".

Integer arithmetic logic unit operations are preferably handled by two or more functional units 76, 78 to avoid problems with bottlenecks and long queue buffers. The integer arithmetic logic unit is a straightforward implementation with one cycle execution. Floating point arithmetic logic units, however, are preferably separated into operation-specific functional units 80, 82, 84, with a single queueing buffer 98 serving the several floating point arithmetic logic unit functional units 80, 82, 84.

Each type of functional unit may require a different execution time. For example, a floating point adder such as functional unit 80 typically takes five cycles to execute, a floating point multiplier typically takes eight cycles to execute, and a floating point divider such as functional unit 84 typically takes 17 cycles to execute. A load/store functional unit such as functional unit 72, for example, takes one cycle per single STORE instruction execution and, provided there is no contention with a "LOAD" instruction, data is directly passed to store buffer 42. In the event of multiple "STORE" instructions, a decoding unit $D_{00}, D_{01}, D_{02}, D_{03}$, will not allow any further instructions into decoder 16 until store functional unit 72 completes its consecutive STORE instructions.

Functional unit 72 takes one cycle to execute a LOAD instruction, provided there is no pending LOAD request. Writing back loaded data to primary register 32 works essentially the same as an arithmetic logic unit instruction and takes a similar amount of time for execution. For multiple "LOAD" instructions, a decoding unit $D_{00}$-$D_{03}$ will not allow any further instructions to be loaded and functional unit 72 executes its multiple "LOAD" instructions until it is completed. Since external memory requests for LOAD instructions may take four clock cycles or more, queueing buffer 92 for load/store functional unit 72 preferably queues up to eight entries.

When execution of an instruction by execution unit 28 is completed, tags in primary register 32 are reset. READ tags are reset first. Result operands have two extra bits indicating temporary register bit and branch bit. If those temporary and branch bits are both set, the data will update temporary register 50. If, however, the branch bit is not set and the temporary bit is set, then the READ and WRITE tag of primary register 32 must be checked to determine whether data is to be written to primary register 32 or to temporary register 50. If either the READ or WRITE tag in the scoreboard is set in primary register 32, then the resultant operand, with its associated branch and temporary bits, is written into temporary register 50. If neither the temporary or branch bit of the resultant operand are set, then the data will update primary register 32 and the WRITE tag for that entry will be set in primary register 32.

Figure 3:
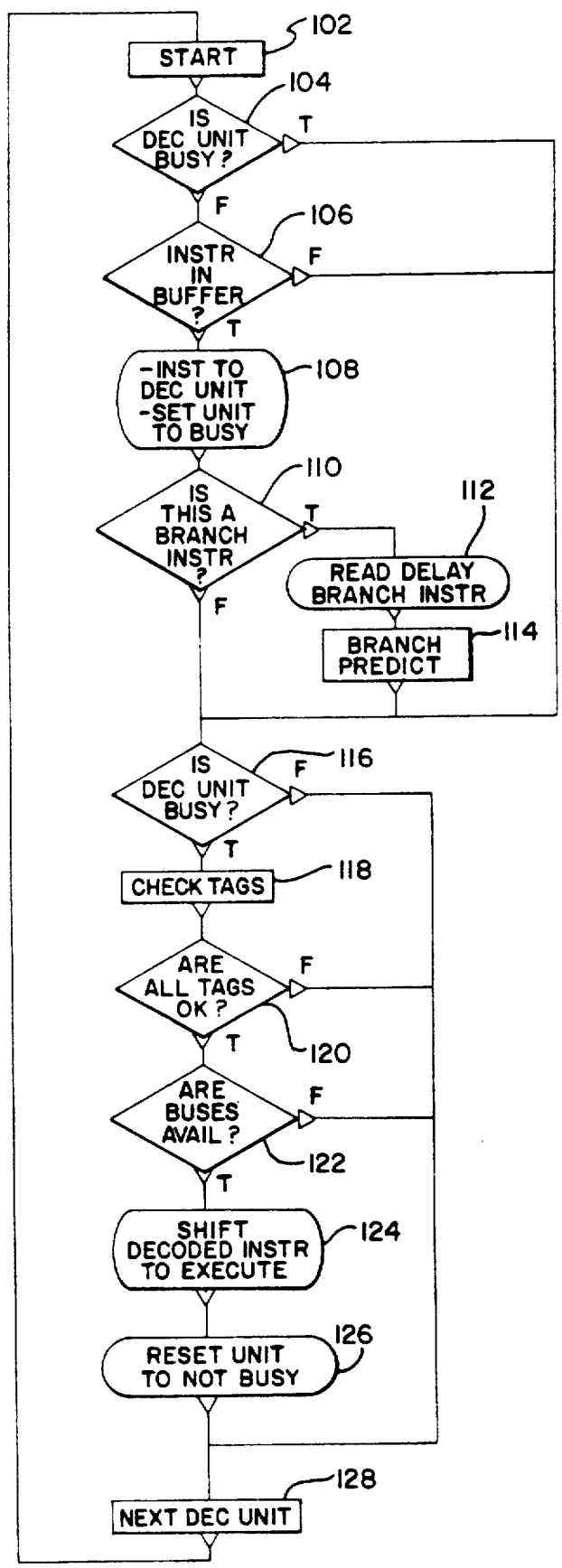
FIG. 3 is a flow diagram illustrating the portion of the control program which controls instruction decoding in the preferred embodiment of the present invention.

FIG. 3 is a flow diagram illustrating a portion of the control program which controls instruction decoding in the preferred embodiment of the present invention.

In FIG. 3, the process of instruction decoding begins at block 102 "Start". The first determination, represented by block 104, is whether the particular decoding unit is busy. In this context, the term "busy" means that if a given decoder unit is busy, then an instruction is in that decoding unit and is valid. If the particular decoding unit is busy, then the flow diagram branches to block 116 to reinquire as to the busy status of the decoding unit for further routing through the flow chart. The decoding unit's being busy predetermines its handling at block 116 to route the decision flow to block 118 where tags are checked. That is, the READ tag, the WRITE tag, and the TEMPORARY tag are checked in principal register 32 (see FIG. 1) to ascertain whether source operands are available for use with the instruction in the decoding unit and whether an address is available for a destination for resultant operands resulting from the execution of the instruction. Block 120 inquires whether all tags are appropriately set to satisfy the above-mentioned requirements and, if all tags are appropriately set, then block 122 initiates a check to ensure that READ buses 34, 36 (see FIG. 1) are available to transfer source operand information from principal register 32 to execution unit 28 for use with the instruction to be executed therein. If the buses are available, then, according to block 124, the decoded instruction is shifted from the decoding unit to the execution unit 28 for further processing in execution unit 28. Block 126 effects a resetting of the decoding unit to a "not busy" status in anticipation of receiving a later instruction and block 128 subsequently turns the attention of this portion of the control program to the next decoding unit to be addressed, which next decoding unit is addressed starting at block 102.

If, at the outset of the consideration of the first decoding unit just described the decoding unit is not busy, then block 104 routes the decision process to block 106 where inquiry is made as to whether an instruction is in instruction buffer 14.

If no instruction is in instruction buffer 14, then block 106 routes the decision through block 116 to block 128 whereupon the control program continues its inquiry as to the next decoding unit to be interrogated.

If the inquiry associated with block 106 determines that an instruction is present in instruction buffer 14, then, according to block 108, an instruction is shifted into the decoding unit being considered and the decoding unit is set to indicate that it is busy. Block 110 then inquires whether this is a branch instruction, and if so, according to block 112, the delay branch instruction is read and, according to block 114, branch prediction unit 58 is employed to predict whether the branch will be taken or not. Thence block 116 branches the decision to block 118 (since the decoding unit has now been set to "busy" according to block 108) and the process of checking tags, READ buses, and the like continues as previously described. Similarly, if the instruction is not a branch instruction, then block 110 routes the decision to block 116 directly and again, since the decoding unit has been set to busy according to block 108, the decision process continues through blocks 118, 120, 122, 124, 126, and 128 as described above.

The decisions represented by the flow diagram of FIG. 3 continue to sequentially address the respective decoding units $D_{00}$, $D_{01}$, $D_{02}$, $D_{03}$ from most significant to least significant, and cyclically back to most significant, in a continuous fashion to efficiently move instructions through the pipeline architecture of apparatus 10.

It is to be understood that, while the detailed drawings and specific examples given describe preferred embodiments of the invention, they are for the purpose of illustration only, that the apparatus of the invention is not limited to the precise details and conditions disclosed and that various changes may be made therein without departing from the spirit of the invention which is defined by the following claims.

I claim:

1. An apparatus for facilitating instruction processing in a computing device, said computing device having an instruction storage means for storing a plurality of instructions, a storage register means for temporarily storing information, and an instruction executing means for executing instructions; the apparatus providing decoded instructions for execution by said instruction executing means; the apparatus comprising:
   an instruction buffer means, connected to said instruction storage means, for temporarily storing said plurality of instructions received from said instruction storage means in a predetermined sequence as fetched instructions; and
   decoding means, connected to said instruction buffer means, said instruction executing means, and said storage register means, for receiving said fetched instructions from said instruction buffer means in said predetermined sequence and providing decoded instructions to said instruction executing means;
   said instruction buffer means being configured for first-in-first-out storage of said fetched instructions;
   said decoding means comprising a plurality of decoder units for concurrently decoding said fetched instructions from said instruction buffer means, said plurality of decoder units being arranged for inter-unit transfer among said plurality of decoder units, for communication with said storage register means, and for parallel output from each of said plurality of decoder units to said instruction executing means, said plurality of decoder units being hierarchically arranged from a lowest-significance decoder unit to a highest-significance decoder unit, said highest-significance decoder unit having a higher priority level than said lowest-significance decoder unit; each of said plurality of decoder units concurrently interrogating said storage register means to determine whether certain conditions are satisfied, said certain conditions being source operands necessary for execution of a respective decoded instruction being available for delivery to said instruction execution means and said storage register means being available to receive resultant operands of said respective decoded instruction, each of said plurality of decoder units obtaining source operands when available from said storage register means according to said priority level, when one of said decoder units having the highest priority level determines that said certain conditions are satisfied, providing a corresponding decoded instruction to said instruction executing means, and when said one of said decoder units determines that said certain conditions are not satisfied, shifting said respective decoded instruction to a higher-significance available vacant decoder unit, maintaining said predetermined sequence and providing a corresponding decoded instruction to said instruction executing means from a next lower-significance decoder unit which satisfies said certain conditions.

2. An apparatus for facilitating instruction processing in a computing device as recited in claim 1 wherein:
   said instruction buffer means comprises a plurality of storage devices configured for hierarchical shifting through at least one of said plurality of storage devices to said decoding means.

3. An apparatus for facilitating instruction processing in a computing device as recited in claim 1 wherein said decoding means comprises a first-in-first-out register.

4. An apparatus for facilitating execution of a program by a computing device; said program comprising a plurality of instructions stored in an instruction store, said plurality of instructions being arranged in a program order; said computing device including a storage means for storing information and an executing means connected to said storage means for executing instructions; the apparatus providing decoded instructions for execution by said executing means; the apparatus comprising:

- an instruction buffer means connected to said instruction store for fetching said plurality of instructions from said instruction store in a plurality of fetch batches, each of said plurality of fetch batches including a predetermined number of fetched instructions from said plurality of instructions in said program order; and
- a decoding means connected to said instruction buffer means, said storage means, and said executing means for receiving said fetched instructions in successive fetch batches of said plurality of fetch batches in successive clocking periods from said instruction buffer means and decoding said fetched instructions to provide said decoded instructions to said executing means;
- said decoding means comprising a plurality of decoder units for concurrently decoding said fetched instructions; said plurality of decoder units being hierarchically arranged from a lowest-significance decoder unit to a highest-significance decoder unit, said highest-significance decoder unit having a higher priority level than said lowest-significance decoder unit; said plurality of decoder units being arranged for inter-unit transfer among said plurality of decoder units, for concurrent communication with said storage means, and for parallel output selectively from each of said plurality of decoder units to said executing means; said decoding means determining, for each said successive fetch batch and based upon said communication with said storage means, first class fetched instructions and second class fetched instructions, said first class fetched instructions being ready for execution and said second class fetched instructions not being ready for execution; said decoding means providing said first class fetched instructions from highest-significance decoder units, containing first class fetched instructions, of said plurality of decoder units to said executing means as said decoded instructions; said decoding means shifting said second class fetched instructions to higher-significance available decoder units of said plurality of decoder units, maintaining said program order among said second class fetched instructions, before receiving a next said successive fetch batch; said decoding means retaining said second class fetched instructions until predetermined conditions are fulfilled; said decoding means shifting said second class fetched instructions from highest-significance decoder units, containing second class fetched instructions, of said plurality of decoder units to said executing means as said decoded instructions when said predetermined conditions are fulfilled.

5. An apparatus for facilitating execution of a program by a computing device as recited in claim 4 wherein said predetermined conditions include operand information required to execute a respective second class fetched instruction being available in said storage means, a conveying means being available for transferring said operand information to said executing means, and availability of a storage site in said storage means for storing a resultant operand generated by execution of said respective second class fetched instruction.

* * * * *